United States Patent

Sugimoto et al.

(10) Patent No.: US 6,560,392 B2
(45) Date of Patent: May 6, 2003

(54) OPTICAL AMPLIFYING GLASS FIBER

(75) Inventors: Naoki Sugimoto, Kanagawa (JP);
Yutaka Kuroiwa, Kanagawa (JP);
Setsuro Ito, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 107 days.

(21) Appl. No.: 09/840,136

(22) Filed: Apr. 24, 2001

(65) Prior Publication Data

US 2003/0007759 A1 Jan. 9, 2003

(51) Int. Cl.$^7$ .................................................. G02B 6/02
(52) U.S. Cl. ............................. 385/123; 372/6; 385/142
(58) Field of Search ................................ 385/141–145, 385/123; 372/6

(56) References Cited

U.S. PATENT DOCUMENTS 5,253,322 A * 10/1993 Onishi et al. .................. 372/6
5,930,436 A * 7/1999 Okamura et al. ............... 372/6
6,236,496 B1 * 5/2001 Yamada et al. ........ 359/341.33

FOREIGN PATENT DOCUMENTS

| JP | 3-218945 | 9/1991 |
| JP | 8-110535 | 4/1996 |
| JP | 11-236245 | 8/1999 |
| JP | 11-317561 | 11/1999 |

* cited by examiner

*Primary Examiner*—Hung N. Ngo
(74) *Attorney, Agent, or Firm*—Oblon, Spivak, McClelland, Maier & Neustadt, P.C.

(57) ABSTRACT

An optical amplifying glass fiber comprising a core glass and a clad glass, wherein a relation of:

$$0.0005 \leq (n_1 - n_2)/n_1 \leq 0.1$$

where $n_1$ and $n_2$ are refractive indices of the core glass and the clad glass, respectively, is satisfied, the fiber has a length of at most 25 cm, the core glass contains Er, and the wavelength width wherein a gain is obtainable with light having a wavelength of from 1.50 to 1.59 $\mu$m, is at least 30 nm.

7 Claims, No Drawings

OPTICAL AMPLIFYING GLASS FIBER

BACKGROUND OF THE INVENTION

1. Field of the Invention

The present invention relates to an optical amplifying glass fiber which is operable within a wavelength range of from 1.5 to 1.6 μm.

2. Discussion of Background

For the purpose of application to an optical communication field, an optical amplifier using as an optical amplifying medium a glass fiber having a rare earth element added to the core, particularly an Er (erbium)-doped optical fiber amplifier, is being studied and developed, and its application to an optical communication system is actively being developed.

On the other hand, in order to cope with diversification of communication services expected in future, a wavelength division multiplexing optical communication system (WDM) has been proposed to increase the transmission capacity. In WDM, the transmission capacity increases as the number of wavelength division multiplexing channels increases. Application of "an optical amplifying glass fiber using an Er-doped fiber as a core" (EDF) to WDM has been studied. For example, EDF wherein the core is an Er-doped quartz type glass fiber (quartz type EDF) or EDF wherein the core is an Er-doped fluoride glass fiber (fluoride type EDF), has heretofore been proposed.

With the conventional quartz type EDF, it is known that the maximum gain with light within a wavelength range of from 1.5 to 1.6 μm, is obtainable when its length is from 10 to 30 m (the length at which the maximum gain is obtainable, varies depending upon the wavelength, the Er concentration, etc.). Accordingly, in a conventional optical amplifier employing the quartz type EDF, it is common to use e.g. a quartz type EDF of from 10 to 30 m wound into a bobbin having a diameter of about 5 cm in order to carry out the desired optical amplification and to accommodate the quartz type EDF in a container having a size of about 30 cm. However, if the quartz type EDF is wound into a bobbin as mentioned above, a bending stress is exerted to the quartz type EDF, and there has been a problem that the quartz type EDF is likely to be broken due to static fatigue during the use for a long period of time.

Further, with the conventional fluoride type EDF, it is known that the maximum gain with light within a wavelength range of from 1.5 to 1.6 μm can be obtained when its length is from 10 to 40 m, and also the optical amplifier employing such a fluoride type EDF has had the same problem as the optical amplifier employing a quartz type EDF.

Further, the quartz type EDF and the fluoride type EDF had a problem that the wavelength width within which a gain with light within a wavelength range of from 1.5 to 1.6 μm, is obtainable, is small.

In order to solve such problems, it is desired to develop EDF which can be accommodated in a container having a size of about 30 cm without being wound into a bobbin, and whereby the desired optical amplification can be obtained in a wide range.

SUMMARY OF THE INVENTION

It is an object of the present invention to provide EDF whereby the foregoing problems can be solved.

The present invention provides an optical amplifying glass fiber comprising a core glass and a clad glass, wherein a relation of:

$$0.0005 \leq (n_1 - n_2)/n_1 \leq 0.1$$

where $n_1$ and $n_2$ are refractive indices of the core glass and the clad glass, respectively, is satisfied, the fiber has a length of at most 25 cm, the core glass contains Er, and the wavelength width wherein a gain is obtainable with light having a wavelength of from 1.50 to 1.59 μm, is at least 30 nm.

DETAILED DESCRIPTION OF THE PREFERRED EMBODIMENTS

The optical amplifying glass fiber of the present invention comprises a core glass and a clad glass. Usually, a protective resin is coated on the outer side of the clad glass. As such a resin, a silicone resin, an acrylic resin, an epoxy resin or a polyimide resin, may, for example, be mentioned.

Between the refractive index $n_1$ of the core glass and the refractive index $n_2$ of the clad glass, a relation represented by the following formula, is satisfied.

$$0.0005 \leq (n_1 - n_2)/n_1 \leq 0.1$$

If $(n_1-n_2)/n_1$ is less than 0.0005, it tends to be difficult to confine light within the core glass. Preferably, it is at least 0.001, more preferably at least 0.003. If it exceeds 0.1, it tends to be difficult to transmit light in a single mode within the optical amplifying glass fiber. It is preferably at most 0.08, more preferably at most 0.05.

The core glass is one having Er added to a matrix glass. The amount of Er added to the matrix glass is preferably from 0.05 to 10 wt % (based on the matrix glass). If it is less than 0.05 wt %, it is likely that the desired optical amplification (the gain, and the wavelength width within which the gain can be obtained) may not be obtained. It is preferably at least 0.1 wt %, more preferably at least 0.2 wt %. If it exceeds 10 wt %, vitrification tends to be difficult. It is preferably at most 5 wt %, more preferably at most 3 wt %.

The above matrix glass preferably contains $Bi_2O_3$ within a range of from 25 to 70 mol %. If it is less than 25 mol %, the desired optical amplification may not be obtained. If it exceeds 70 mol %, vitrification tends to be difficult. A preferred composition of the matrix glass is from 25 to 70 mol % of $Bi_2O_3$, from 5 to 74.79 mol % of $B_2O_3+SiO_2$, from 0.1 to 30 mol % of $WO_3+TeO_2+Ga_2O_3$, from 0.01 to 10 mol % of $CeO_2$, and from 0.1 to 30 mol % of $Al_2O_3+Ga_2O_3$.

The composition of the above clad glass is usually determined based on the composition of the above matrix glass, so that its refractive index $n_2$ satisfies the above-mentioned relation with the refractive index $n_1$ of the core glass.

The length of the optical amplifying glass fiber of the present invention is at most 25 cm. If it exceeds 25 cm, it tends to be difficult to accommodate it in a container having a size of about 30 cm without winding it into a bobbin shape. It is preferably at most 20 cm, more preferably at most 15 cm. Further, its length is preferably at least 0.5 cm. If it is less than 0.5 cm, handling or connection to another glass fiber tends to be difficult. More preferably, it is at least 1 cm.

Into the optical amplifying glass fiber, excitation light is introduced together with signal light. G calculated by the formula:

$$G = 10 \times \log_{10}(I_{out}/I_{in})$$

wherein $I_{in}$ is the intensity of the incident signal light, and $I_{out}$ is the intensity of the signal light coming out of the optical amplifying glass fiber, is referred to as the gain (unit: dB) in the present invention.

With the optical amplifying glass fiber of the present invention, the wavelength width wherein a gain is obtainable with light having a wavelength of from 1.50 to 1.59 μm (i.e. G>0) is at least 30 nm. If it is less than 30 nm, the number of channels in WDM tends to be too small. It is preferably at least 50 nm, more preferably at least 60 nm, particularly preferably at least 70 nm, most preferably at least 80 nm.

The minimum value of the gain with light having a wavelength of from 1.50 to 1.59 μm with the optical amplifying glass fiber of the present invention, is preferably at least 8 dB. If it is less than 8 dB, the desired optical amplification may not be obtained. It is more preferably at least 9 dB, particularly preferably at least 10 dB, most preferably at least 15 dB.

The gain with light having a wavelength of 1.53, of the optical amplifying glass fiber of the present invention, is preferably at least 8 dB. It is more preferably at least 9 dB, particularly preferably at least 10 dB, most preferably at least 15 dB.

The optical amplifying glass fiber of the present invention can be prepared, for example, as follows. The starting materials are mixed and put into a platinum crucible, an aluminum crucible, a quartz crucible or an iridium crucible and melted at a temperature of from 800 to 1,300° C. in air, and the obtained melt is cast in a mold to prepare a core glass and a clad glass. Then, the core glass and the clad glass are put together and subjected to extrusion molding at a temperature of from 400 to 500° C. to obtain a preform having a core/clad structure. This preform is put and softened in an electric furnace of about 500° C. and subjected to wire drawing while controlling to obtain a desired outer diameter. When a resin layer is to be formed around the clad glass, for example, a UV curable resin is coated on the core/clad structure glass fiber obtained by the above-mentioned wire drawing, followed by UV irradiation to form the above resin layer.

EXAMPLE

A glass fiber comprising a core glass and a clad glass having the compositions shown in Table 1 and having a diameter (clad diameter) of 125 μm and a diameter of the core glass portion of 4 μm, was prepared. The composition shown in Table 1 is represented by mol % with respect to the components from $Bi_2O_3$ to $CeO_2$, and by wt % (based on other components) with respect to Er.

The refractive index $n_1$ of the core glass was 2.04, and the refractive index $n_2$ of the clad glass was 2.03, and accordingly, $(n_1-n_2)/n_1$ is 0.0049.

The above glass fiber was coated with a UV curable acrylic resin, followed by UV irradiation, to obtain a resin-coated glass fiber having a diameter of 250 μm.

TABLE 1

|  | $Bi_2O_3$ | $B_2O_3$ | $SiO_2$ | $Ga_2O_3$ | $Al_2O_3$ | $CeO_2$ | Er |
|---|---|---|---|---|---|---|---|
| Core glass | 42.8 | 28.5 | 14.3 | 7.1 | 7.1 | 0.2 | 0.6 |
| Clad glass | 42.8 | 28.5 | 14.3 | 3.6 | 10.6 | 0.2 | — |

Three resin-coated glass fibers as described above, which have lengths of 6 cm, 10 cm and 15 cm, respectively, were prepared, and a light obtained by combining a light having a wavelength of from 1.50 to 1.59 μm (signal light: 0.001 mW) and a pumping laser beam having a wavelength of 975 nm (50 mW) by a light coupling device, was introduced into these resin-coated glass fibers. The gains (unit: dB) of these resin-coated glass fibers with lights having wavelengths of 1.50, 1.53, 1.56 and 1.59 μm, were calculated from the intensities of the incident signal lights and the intensities of signal lights coming out of the resin-coated glass fibers. The results are shown in Table 2.

It is evident from Table 2 that with the resin-coated glass fibers having lengths of 6 cm and 10 cm, the gains were obtained with lights having wavelengths of from 1.50 to 1.59 μm, whereby the wavelength width in which the gain is obtainable, was 0.09 μm i.e. 90 nm in each case. Whereas with the resin-coated glass fiber having a length of 15 cm, the gains were obtained with lights having wavelengths of from 1.53 to 1.59 μm, whereby the wavelength width in which the gain is obtainable was at least 0.06 μm and less than 0.09 μm i.e. at least 60 nm and less than 90 nm. Further, the gains of these resin-coated glass fibers with a light having a wavelength of 1.53 μm, were at least 9 dB, respectively.

TABLE 2

| Wavelength (μm) | 1.50 | 1.53 | 1.56 | 1.59 |
|---|---|---|---|---|
| Length: 6 cm | 10 | 16 | 14 | 9 |
| Length: 10 cm | 4 | 12 | 12 | 8.6 |
| Length: 15 cm | −4 | 9 | 11 | 8 |

With the optical amplifying glass fiber of the present invention, even if the length is only 6 cm, a desired broad band optical amplification i.e. optical amplification for WDM can be made possible. Accordingly, optical amplification of a broad band can be made possible by an optical amplifier having the optical amplifying glass fiber of the present invention having a length of e.g. 6 cm accommodated without being wound into a bobbin in a container having a size of about 30 cm which is commonly used. The possibility of breakage of the optical amplifying glass fiber of the present invention which is not wound into a bobbin, is less than the conventional optical amplifying glass fiber commonly used as wound into a bobbin, and thus it is possible to produce a highly reliable optical amplifier.

What is claimed is:

1. An optical amplifying glass fiber comprising a core glass and a clad glass, wherein a relation of:

$$0.0005 \leq (n_1-n_2)/n_1 \leq 0.1$$

where $n_1$ and $n_2$ are refractive indices of the core glass and the clad glass, respectively, is satisfied, the fiber has a length of at most 25 cm, the core glass contains Er, and the wavelength width wherein a gain is obtainable with light having a wavelength of from 1.50 to 1.59 μm, is at least 30 nm.

2. The optical amplifying glass fiber according to claim 1, wherein the gain with light having a wavelength of 1.53 μm is at least 8 dB.

3. The optical amplifying glass fiber according to claim 1, wherein $(n_1-n_2)/n_1$ is at least 0.001 and at most 0.08.

4. The optical amplifying glass fiber according to claim 1, wherein the core glass comprises Er and a matrix glass and contains Er in an amount of from 0.05 to 10 wt % based on the matrix glass.

5. The optical amplifying glass fiber according to claim 4, wherein the matrix glass contains $Bi_2O_3$ within a range of from 25 to 70 mol %.

6. The optical amplifying glass fiber according to claim 1, wherein the length of the fiber is at most 20 cm and at least 0.5 cm.

7. The optical amplifying glass fiber according to claim 1, wherein the wavelength width wherein a gain is obtainable with light having a wavelength of from 1.50 to 1.59 μm, is at least 50 nm.

* * * * *